United States Patent
Hägele

[11] 3,940,192
[45] Feb. 24, 1976

[54] HOUSING FLANGE FOR WORM GEAR BEARINGS

[75] Inventor: Gerhard Hägele, Hohenstadt, Germany

[73] Assignee: Zahnradfabrik Friedrichshafen AG, Friedrichshafen, Germany

[22] Filed: July 16, 1974

[21] Appl. No.: 489,034

[30] Foreign Application Priority Data
Aug. 1, 1973   Germany........................... 7328067

[52] U.S. Cl............................ 308/189 R; 308/189 A
[51] Int. Cl.² ........................................ F16C 13/00
[58] Field of Search........ 308/189 A, 189 R, 184 A, 308/184 R, 193

[56]         References Cited
           UNITED STATES PATENTS

| | | | |
|---|---|---|---|
| 1,362,910 | 12/1920 | Zoeller et al................... | 308/189 R |
| 3,316,036 | 4/1967 | Bligard et al.................... | 308/189 R |
| 3,351,398 | 11/1967 | Park et al........................ | 308/189 R |
| 3,386,385 | 6/1968 | Bartheld et al. ................ | 308/189 R |
| 3,788,437 | 1/1974 | Camp................................ | 308/184 |

*Primary Examiner*—M. Henson Wood, Jr.
*Assistant Examiner*—Richard A. Bertsch

[57]         ABSTRACT

A housing for the bearing of a worm gear of the type used in steering gear devices of vehicles is provided with a cover plate having an annular groove or cavity into which the conical disc spring which bears on a ball bearing race can bend or bow in order to give it the freedom required for precise pretensioning or resilient compression against the radial face of the race.

2 Claims, 3 Drawing Figures

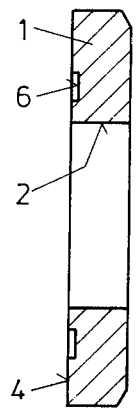
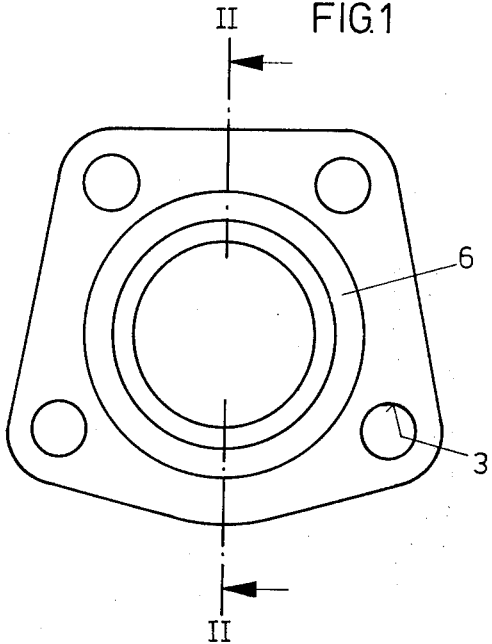
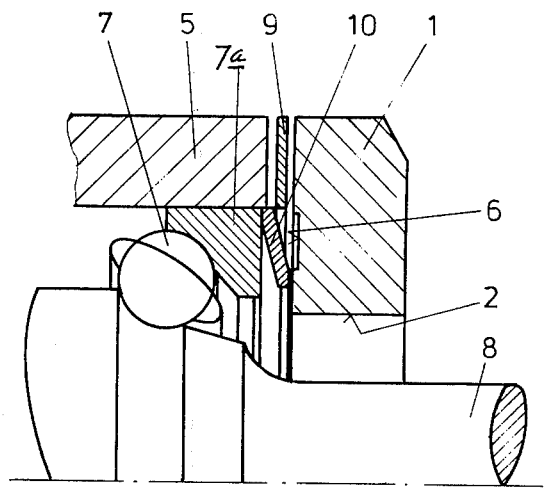

HOUSING FLANGE FOR WORM GEAR BEARINGS

Briefly, in prior art arrangements plate springs are used, namely springs which are provided with a certain amount of conicity between the cover of a bearing housing and the race. This spring becomes arched as the cover is fastened in place. A portion of the arch spring surface, bowing outwardly, is interferred with by the cover hampering the free arching movement. This makes it impossible to precisely determine the pressure brought to bear on the bearing race by the spring.

This drawback is compensated for in prior art constructions by the use of spacers disposed between the housing and the cover in order to prevent engagement of the arching spring with the cover. However, the present invention eliminates such spacers except for a single spacer which may be required to compensate for the thickness of the plate spring in tightening the cover to the housing.

A detailed description of the invention now follows in conjunction with the appended drawing in which:

FIG. 1 is a plan view of the housing cover;

FIG. 2 shows a cross section on line II—II of FIG. 1; and

FIG. 3 is a longitudinal section illustrating the assembly of components of the invention as applied to a worm gear bearing prior to fastening of the cover plate to the housing.

Referring to the drawing, a bearing cover 1 has a center bore 2 and bores 3 for screws to fasten the cover to worm gear housing 5.

The cover is provided with an annular groove 6 on its inner radial face concentric to bore 2. An annular ball bearing as indicated at 7 around the worm gear shaft 8 which ball bearing has a race 7a. A ring spacer 9 is intermediate housing 5 and cover 1 which spacer in effect determines the pretension of a conical ring-like spring 10 when the cover and housing are drawn against each other, thus precisely determining the axial force which the spring 10 bears against the bearing race 7a.

It will be appreciated that spring 10 between the cover and housing will change shape when the cover is drawn against the housing. There is an arching or bowing of the spring 10 which changes in length axially. In fact, the change is generally from rectangular to somewhat spherical in section. In order to avoid any restriction on the natural bowing of the spring 10 by engagement with the cover, which would destroy precise determination of axial force, a groove 6 which may be rather slight in depth is provided on the cover. This prevents the bowed spring 10 from being engaged by the cover in any measure that would affect the axial force which the stressed spring 10 exerts.

Thus, the plate spring essentially engages the race 7a at its outer periphery and engages the cover at its inner periphery so that it is free to bow and take an unrestricted arched shape under the compressive action of the cover when the cover is fastened to the housing. The effect achieved makes it possible to provide a precise axial force on the worm shaft 8 acting through the bearing and as determined by the thickness of the spacer 9. The advantage produced is the uniformity of turning effort of the worm 8 even when the bearing wears.

I claim:

1. An arrangement for effecting a precisely determined axial force on a thrust bearing within a housing:
    comprising a housing having a bearing race therein;
    a cover on said housing;
    a conical ring-like spring having an edge compressed by said cover to effect axial force of the other edge on said bearing race;
    and an annular groove in said cover disposed to freely accommodate a bowed portion of said spring as it bows under compression, so as to maintain a precise force on said bearing by avoiding abutment between said bowed portion and said cover.

2. An arrangement as set forth in claim 1, including a spacer between said housing and said cover encompassing said spring for predetermining the extent of stress exerted on said spring by said cover dependent upon the thickness of said spacer.

* * * * *